United States Patent [19]

Dodson et al.

[11] 4,336,069

[45] * Jun. 22, 1982

[54] HIGH STRENGTH AGGREGATE FOR CONCRETE

[75] Inventors: Vance H. Dodson, Walpole; Lawrence R. Roberts, Acton, both of Mass.

[73] Assignee: W. R. Grace & Co., Cambridge, Mass.

[ * ] Notice: The portion of the term of this patent subsequent to Jul. 1, 1997, has been disclaimed.

[21] Appl. No.: 235,190

[22] Filed: Feb. 17, 1981

[51] Int. Cl.$^3$ ................................. C04B 7/02

[52] U.S. Cl. .................... 106/97; 106/288 B; 106/DIG. 1

[58] Field of Search ............. 106/97, DIG. 1

[56] References Cited

U.S. PATENT DOCUMENTS

| | | | |
|---|---|---|---|
| 2,414,734 | 1/1947 | Gelbman | 106/41 |
| 2,948,947 | 8/1960 | Duplin, Jr. et al. | 25/156 |
| 3,030,222 | 4/1962 | Eichanlaub | 106/288 |
| 3,192,060 | 6/1965 | Tilsen | 106/97 |
| 3,245,812 | 4/1966 | Hobaugh et al. | 106/63 |
| 3,328,180 | 6/1967 | Ban | 106/41 |
| 3,634,115 | 1/1972 | Minnick | 106/85 |
| 3,717,490 | 2/1973 | Hanser | 106/117 |
| 3,802,899 | 4/1974 | McConnaughy | 106/97 |
| 3,852,084 | 12/1974 | Webster et al. | 106/118 |
| 3,957,528 | 5/1976 | Ott et al. | 106/309 |
| 4,018,617 | 4/1977 | Nicholson | 106/85 |
| 4,018,619 | 4/1977 | Webster et al. | 106/118 |
| 4,101,332 | 7/1978 | Nicholson | 106/85 |
| 4,210,457 | 7/1980 | Dodson et al. | 106/97 |
| 4,240,952 | 12/1980 | Hulbert et al. | 106/97 |
| 4,250,134 | 2/1981 | Minnick | 106/97 |

FOREIGN PATENT DOCUMENTS 2547908  4/1977  Fed. Rep. of Germany ... 106/288 B

*Primary Examiner*—James Poer
*Attorney, Agent, or Firm*—William L. Baker; Edward J. Hanson, Jr.; John J. Wasatonic

[57] ABSTRACT

Concretes containing a hydratable cementitious binder such as Portland cement and a high strength aggregate material are described. The high strength aggregate material is produced from hydrated cementitious compositions which contain relatively low proportions of Portland cement and relatively high proportions of a select fly ash component. The high strength aggregate material is produced by mixing the aforementioned Portland cement and fly ash components with water and allowing such to hydrate. The hydrated aggregate product may then be reduced in size (e.g. by crushing) and screened prior to combination with the cementitious binder to produce concrete compositions. Concretes can be prepared with such aggregate which have at least comparable compressive strengths to concrete prepared using conventional crushed stone aggregate.

16 Claims, No Drawings

HIGH STRENGTH AGGREGATE FOR CONCRETE

BACKGROUND OF THE INVENTION

This invention relates to particulate products useful as aggregate materials in concrete compositions. More particularly, this invention relates to the preparation of high-strength particulate solids and their use in producing concrete compositions having utility in construction and other fields.

Concretes used in a wide variety of construction applications comprise mixtures essentially of solid, relatively inert, particulate materials dispersed or embedded in a matrix of hydrated cementitious binder, such as Portland cement. The inert particulate material, commonly called "aggregate", is usually selected from natural materials such as sand, gravel, and crushed stone, or mixtures of such. Other materials employed as aggregates include slag, cinders, burned clay or shale, etc.

A good aggregate for concrete is one which (a) will form a strong bond between its surface and the surrounding cement paste (or mortar) in the concrete; (b) will not participate in a deleterious reaction with alkali from the cement, and (c) is strong. The strength of the aggregate itself is an important consideration in the ultimate strength of the concrete produced therefrom. There is a continuing need for good aggregate for use in concrete, particularly strong aggregate from readily available and relatively low cost raw materials.

SUMMARY OF THE INVENTION

It has been found that a strong aggregate meeting the above requirements and suited for use in preparing concrete compositions can be prepared from hydrated mixtures of Portland cement and a select fly ash component described in our previous U.S. Pat. No. 4,210,457. Aggregate suited for use in concrete can be prepared from such hydrated mixtures, for example by crushing or otherwise reducing the size thereof, followed optionally by screening to give a desired particle size. Alternatively, aggregate from such hydrated mixtures can be produced in a manner which makes crushing unnecessary. For example, non-hydrated or partially hydrated particles of the desired size can first be formed by known methods of pelletizing, etc., followed by complete hydration to produce the high-strength aggregate. The aggregate produced according to the invention is thereafter mixed with any of the conventional hydratable cementitious binders used in concrete, and also water, and thereafter allowed to hydrate or "cure" to a hardened "concrete" mass of high strength. Any of the conventional additives used in concrete can be used in the concretes produced from the aggregates of the invention. For example, chemicals may be included to regulate setting time, to enhance strength, to entrain air, etc. Also, additional aggregate of the conventional type such as sand, etc., can be included in the concretes produced according to the invention.

DETAILED DESCRIPTION OF THE INVENTION

Fly ash is the finely divided residue generated as a by-product in the combustion of coal as a fuel in power plant boilers, and which is being produced in greater abundance today due to the increased use of coal to produce power. The chemical composition of fly ashes from coals from differing geographical areas sometimes varies significantly as does its chemical activity, that is, its ability to form cementitious compounds.

Our previous U.S. Pat. No. 4,210,457, the disclosure of which is hereby incorporated by reference, describes concrete compositions containing Portland cement, fly ash, and aggregate such as sand and crushed stone, wherein the weight ratio of cement to fly ash is from one part of cement to at least one part of ash, and the fly ash employed is selected to have a certain defined chemical composition. The hydrated concretes from such compositions were found to exhibit unexpectedly high compressive strengths rendering the concrete composition useful for a variety of construction applications.

In the present invention concretes are prepared using as aggregate, hydrated particles of mixtures of Portland cement and the select fly ashes described in the above patent. The cement-fly ash mixtures used herein to obtain the high strength aggregate contain Portland cement and the fly ash component in weight ratios of from 1 part cement to 1 part fly ash, up to weight ratios of 1 part cement to about 15 parts fly ash. A preferred ratio is from 1 part cement to at least about 1.5 parts fly ash.

As aforementioned, the fly ashes used herein to prepare the high-strength aggregate according to the invention are those described in the above patent. Such fly ashes were found to be highly active and not requiring any special treatment to render such active. The fly ashes are characterized in the patent as having a total analyzable calcium oxide greater than about 10, preferably greater than about 15 percent by weight and a combined silica ($SiO_2$), alumina ($Al_2O_3$) and iron oxide ($Fe_2O_3$) content of less than about 80, preferably less than about 75, percent by weight. The fly ashes useful herein will preferably have compositions falling within the approximate general ranges shown in Table I.

TABLE I

| Component | Approximate Composition Range - Wt. % |
|---|---|
| $SiO_2$ | 24.1–43.1 |
| $Al_2O_3$ | 14.3–27.5 |
| $Fe_2O_3$ | 4.2–9.5 |
| $SiO_2 + Al_2O_3 + Fe_2O_3$ | 47.9–72.4 |
| CaO | 16.8–29.6 |
| MgO | 3.7–8.5 |
| $SO_3$ | 1.6–6.4 |

As discussed in the U.S. Pat. No. 4,210,457, the above fly ashes when mixed in the aforementioned ratios with Portland cement, will produce hydrated masses of unexpectedly high compressive strength. In the patent, such fly ashes were shown to exhibit such desirable activity in contrast to fly ashes not meeting the above description. The marked difference in strength performance shown in the patent between the fly ashes at the relatively high addition ratios of fly ash was surprising since such difference was not in evidence from strength measurements involving Portland cement-fly ash compositions wherein the cement to fly ash ratio was less than 1 to 1. The marked difference in strength contribution of the select fly ashes at the higher ratios was further unexpected since it could not have been predicted by a stoichiometric calculation based upon the conventionally theorized "pozzolanic reaction".

Any of the conventional Portland cements presently known can be used to make the high-strength aggregate of the invention. One suitable Portland cement used in the "EXAMPLE" below, has the composition shown in Table II.

TABLE II

| Portland Cement Composition | % |
|---|---|
| $SiO_2$ | 21.9 |
| $Al_2O_3$ | 4.9 |
| $Fe_2O_3$ | 2.7 |
| CaO | 66.0 |
| MgO | 1.2 |
| $SO_3$ | 2.1 |
| Loss on Ignition | 1.2 |
| Alk. as $Na_2O$ | 0.19 |
| $C_3S$ | 59.5 |
| $C_2S$ | 17.9 |
| $C_3A$ | 8.4 |
| $C_4AF$ | 8.2 |

The cement-fly ash mixtures hydrated to produce the high strength aggregate for concrete according to the invention can contain further optional ingredients. For example solid particulate fillers such as sand, etc., can be included. Also chemicals can be included in the mixtures prior to hydration which alter the setting time, increase the strength, etc., thereof, or which entrain air therein and therefore lower the density thereof.

A variety of methods can be used to produce the high strength particulate aggregate of the invention. For example, the above described mixtures of Portland cement can be simply mixed with water, cast and cured into masses of larger size than desired. Thereafter, the hardened masses can be crushed and screened to the desired size. In general, the aggregate of the invention is comprised of particles the diameters of which are less than about three inches. For use as a "coarse" aggregate in concrete, the aggregate preferably comprises a mixtures of particles having diameters in the range of from about ⅜ inches to about 3 inches.

In another method of producing the aggregate, the above mixtures are mixed with water, pelletized using conventional procedures and equipment, cured and screened, if necessary. One pelletizing method which may be mentioned is "pan" pelletizing, as used conventionally in producing pellets or iron ore. In this method, wetted solids are sprayed onto a rotating pan or disk having openings at its perimeter. Solid pellets are formed on the pan which fall selectively from the pan through the openings.

In yet another method of producing the high strength aggregate according to the invention, wetted mixtures of the above composition are extruded through a die or opening of selected size and shape and thereafter hardened or cured. The extruded mass may be chopped or otherwise reduced in size before or after curing. In any of the foregoing methods, a final screening operation may be utilized to give the desired size distribution.

The hardening or curing of the wet cement-fly ash mixtures in the production of the aggregate of the invention can be accomplished according to a variety of conventional methods. The wet mixtures can simply be allowed to hydrate at room temperature under low or high humidity. Steam at atmospheric or at above atmospheric pressure can be introduced during the curing. Also the wetted particles can be cured in an autoclave.

The finally cured cement-fly ash aggregate produced by any of the above methods is thereafter mixed with any hydratable cementitious binder (for example Portland cement) and water to produce high strength concrete masses of wide versatility. The cement and aggregate can be mixed in any desired proportion to produce the concrete. However, at least a sufficient amount of the binder is employed to hold the aggregate together in a solid concrete mass. For structural applications, the aggregate may be present in the concrete composition in an amount of at least about 25 percent of the total volume of the hydrated composition. Other aggregate may be included in such concretes, for example "fine" aggregate (less than about ⅜ inch in size) such as sand, as well as "coarse" aggregate (greater than about ⅜ inch) such as gravel, granite, limestone, shale, etc., The concretes prepared using the aggregate of the invention can also include one more of the conventional chemical admixtures used in concrete such as set accelerators or retarders, air-entraining agents, compressive strength enhancers, etc.,

EXAMPLE

In an experiment, 15,810 grams of Portland cement having a composition as shown in Table II is mixed for three minutes with 42,030 grams of fly ash (1 part cement to 2.5 parts fly ash, by weight) and 12,500 grams of water. The fly ash used had the following chemical composition:

| Component | Wt. % |
|---|---|
| $SiO_2$ | 24.1 |
| $Al_2O_3$ | 14.3 |
| $Fe_2O_3$ | 9.5 |
| CaO | 29.6 |
| MgO | 8.5 |
| $SO_3$ | 5.9 |
| Loss on Ignition | 0.6 |
| $SiO_2 + Al_2O_3 + Fe_2O_3$ | 47.9 |
| Free Lime | 3.63 |

The wet mixture was rapidly mixed for three minutes, cast into 4 inch by 8 inch cylinder molds and moist-cured for three days. The hardened "pastes" were then removed from the molds and crushed in a "Sturtevant" laboratory jaw crusher. The crushed material was then graded by passage through a series of sieves and thereafter used as a "coarse" aggregate in the preparation of a Portland cement concrete composition. For comparison, a "control" Portland cement concrete composition was also prepared using a conventional coarse aggregate material, crushed stone, in place of the inventive cement/fly ash aggregate. The conventional crushed stone aggregate in the "control" was graded in the same fashion and employed in the same volume as in the case of the concrete prepared using the inventive cement/fly ash aggregate. The "oven-dried" densities of the inventive aggregate and the control aggregates, were respectively, 2.45 and 2.53 grams per cubic centimeter. Measurements were taken following procedures of the American Society For Testing And Materials ("ASTM") of the water to cement ratio ("W/C"), the "slump", the percent air and the compressive strength of each of the "inventive" and "control" concrete compositions. The results of the measurements as well as further details of the compositions are shown in Table IV.

TABLE IV

| COMPOSITION | CONCRETE COMPOSITIONS | | | | | | | | |
|---|---|---|---|---|---|---|---|---|---|
| | PORTLAND CEMENT (lbs/yd$^3$) | AGGREGATE TYPE | AGGREGATE AMOUNT (lbs/yd$^3$) | w/c[1] | Slump[2] (Inches) | Air[3] % | Compressive Strength[4] (PSI) | | |
| | | | | | | | 1-Day | 7-Day | 28-Day |
| Control | 510 | Natural crushed aggregate | 1727 | 0.61 | 1 | 2.2 | 1130 | 3373 | 4276 |
| Invention | 500 | Cement-fly ash aggregate | 1672 | 0.65 | ½ | 1.9 | 1411 | 3912 | 5371 |

[1] Ratio of the amount of water to the amount of cement in the composition.
[2] A measure of the relative consistency of the wet mix according to ASTM C143.
[3] Amount of air entrained in the hydrated composition according to ASTM C231.
[4] Measurement of compressive strength after elaspse of 1, 7 and 28 days from placement. Measured according to ASTM C192.

The aggregate produced from the low cement/high fly ash-containing mixtures according to the invention is strong, forms a good bond with the surrounding Portland cement paste (or mortar), and will not participate in the deleterious alkali (from the cement binder)-aggregate reaction. The data shown in Table IV shows that the aggregate of the invention can be used to produce hardened concretes having a compressive strength comparable to, or even greater than, a typical concrete prepared using conventional crushed stone aggregate.

It is claimed:

1. A cementitious concrete composition comprising a mixture of solid, particulate aggregate material of high strength and a cementitious binder therefor, said aggregate being comprised of particles of a hydrated mixture of Portland cement and fly ash wherein said Portland cement and fly ash are present in a weight ratio of from 1 part cement to at least one part ash, said fly ash upon analysis having a total calcium oxide content greater than about 10 percent by weight, the total additive amount of $SiO_2$, $Al_2O_3$ and $Fe_2O_3$ present in said fly ash being less than about 80 percent by weight, said fly ash further not having been first treated to promote activity prior to mixture with said Portland cement.

2. The concrete composition of claim 1 wherein said ratio of cement to fly ash is from 1 part cement to at least 1.5 parts fly ash.

3. The concrete composition of claim 1 wherein said aggregate comprises particles the diameter of which is less than about three inches.

4. The concrete composition of claim 1 wherein said aggregate is present in an amount greater than about 50 percent by volume of the total composition.

5. The concrete composition of claim 1 to which is additionally added sufficient water to render the dry mixture plastic.

6. A dense, hard, hydrated concrete mass produced by addition of water to a dry mixture of the components of claim 1 and thereafter allowing the resulting wet mixture to harden.

7. The composition of claim 1 wherein said fly ash exhibits the following chemical analysis:

| COMPONENTS | APPROXIMATE % BY WEIGHT |
|---|---|
| $SiO_2$ | 24.1–43.1 |
| $Al_2O_3$ | 14.3–27.5 |
| $Fe_2O_3$ | 4.2–9.5 |
| $SiO_2 + Al_2O_3 + Fe_2O_3$ | 47.9–72.4 |
| CaO | 16.8–29.6 |
| MgO | 3.7–8.5 |
| $SO_3$ | 1.6–6.4 |

8. The concrete composition of claim 1 wherein said calcium oxide content is greater than about 15 percent by weight, and said total additive amount of $Si_2O$, $Al_2O_3$ and $Fe_2O_3$ is less than about 75 percent.

9. The composition of claim 1 wherein said binder is Portland cement.

10. The composition of claim 1 wherein said aggregate is a particulate product produced by first mixing said Portland cement, said fly ash and water and allowing such mixture to hydrate, and thereafter reducing the size of the hydrated product to a desired particle size range.

11. The method of producing a solid, particulate material of high strength and suitable for use as an aggregate in cementitious concrete compositions, said method comprising the steps of preparing mixtures of Portland cement, fly ash and water and thereafter causing hydration of such mixtures and recovering the hydrated product in the form of solid particles having a diameter of less than about three inches, said Portland cement and fly ash being present in said mixtures in a weight ratio of from 1 part cement to at least 1 part ash, said fly ash upon analysis having a total calcium oxide content greater than about 10 percent by weight, the total additive amount of $SiO_2$, $Al_2O_3$ and $Fe_2O_3$ present in said fly ash being less than about 80 percent by weight, said fly ash further not having been first treated to promote activity prior to incorporation in said mixture.

12. The method of claim 11 comprising the steps of preparing said mixtures of said cement, ash and water, forming said wet mixtures into solid, hydrated products, and thereafter reducing the size of the hydrated products to a desired value.

13. The method of claim 12 wherein said reduction in size is accomplished by crushing.

14. The method of claim 11 wherein pellets of said mixtures of said cement, ash and water are caused to be produced which are thereafter hydrated to form solid hardened particles.

15. The method of claim 11 wherein said mixtures of said cement, ash and water are shaped by extrusion and the extruded shapes thereafter reduced in size before or after hydration thereof.

16. The method of any of the claims 11 through 15 wherein the recovered hydrated product is screened to produce a desired particle size.

* * * * *